(12) United States Patent
Jiang et al.

(10) Patent No.: US 6,906,310 B1
(45) Date of Patent: Jun. 14, 2005

(54) LEVEL

(75) Inventors: Yeou-bin Jiang, Taichung (TW);
Jian-Long Huang, Taichung (TW);
Shu-Hung Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 10/899,329

(22) Filed: Jul. 26, 2004

(30) Foreign Application Priority Data

Jan. 5, 2004 (TW) ...................................... 93100119 A

(51) Int. Cl.⁷ .............................................. G01C 9/02
(52) U.S. Cl. ...................... 250/231.1; 250/216; 33/227; 33/290; 356/139.1
(58) Field of Search ................................ 250/216, 221, 250/231.1, 231.13–231.18; 33/227, 290, 291, 278–280, 286; 356/138, 139.1; 200/61.45 R, 61.46, 61.52, 61.53

(56) References Cited

U.S. PATENT DOCUMENTS 5,108,177 A * 4/1992 Middleton .................. 356/250
6,399,941 B1 * 6/2002 Nakagaki et al. ...... 250/231.13

* cited by examiner

*Primary Examiner*—Kevin Pyo
(74) *Attorney, Agent, or Firm*—Thomas, Kayden, Horstemeyer & Risley

(57) ABSTRACT

A level. A projected plane is generated substantially parallel to a reference plane by a light source rotatably emitting light. A main shaft, having a rotary portion and a pair of protrusions and connecting to the light source, is perpendicular to the projected plane. A universal joint is disposed in a housing with the main shaft rotatably passing therethrough. A level sensor detects inclination of the projected plane deviated from the reference plane and outputs an adjustment signal. An adjustment mechanism has a first movable member and a second movable member crossing each other. The first movable member impels one protrusion along a first axis, and the second movable member impels one protrusion along a second axis perpendicular to the first axis according to the adjustment signal. The main shaft is rotated around the universal joint until perpendicular to the reference plane with the projected plane parallel thereto.

10 Claims, 5 Drawing Sheets

LEVEL

BACKGROUND OF THE INVENTION

1. Field of the Invention

The present invention relates in general to a level and in particular to a rotary level suitable for various environments.

2. Description of the Related Art

Levels are generally applied in construction to provide a standard level line. Compared with the traditional means of stretching a line manually, levels are more convenient, accurate, and can save manpower and time. A conventional level is provided with a laser module and a reflector reflecting light emitted from the laser module onto an object, such that a bright alignment point is formed on the object applicable to calibration and measurement. When the level is placed on an uneven surface, however, light deflection occurs and accurate calibration is difficult to achieve utilizing only the single alignment point.

SUMMARY OF THE INVENTION

Accordingly, an object of the present invention is to provide a level suitable for various environments. The level provides a projected plane substantially parallel to a reference plane by a light source rotatably emitting light. A main shaft, having a rotary portion and a pair of protrusions and connecting to the light source, is perpendicular to the projected plane. A universal joint is disposed in a housing with the main shaft rotatably passing therethrough. A level sensor detects the inclination of the projected plane deviated from the reference plane and outputs an adjustment signal accordingly. An adjustment mechanism in the housing has a first movable member and a second movable member crossing each other. The first movable member impels one protrusion along a first axis, and the second movable member impels one protrusion along a second axis substantially perpendicular to the first axis according to the adjustment signal. The main shaft is rotated around the universal joint until perpendicular to the reference plane with the projected plane parallel thereto.

DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1A:
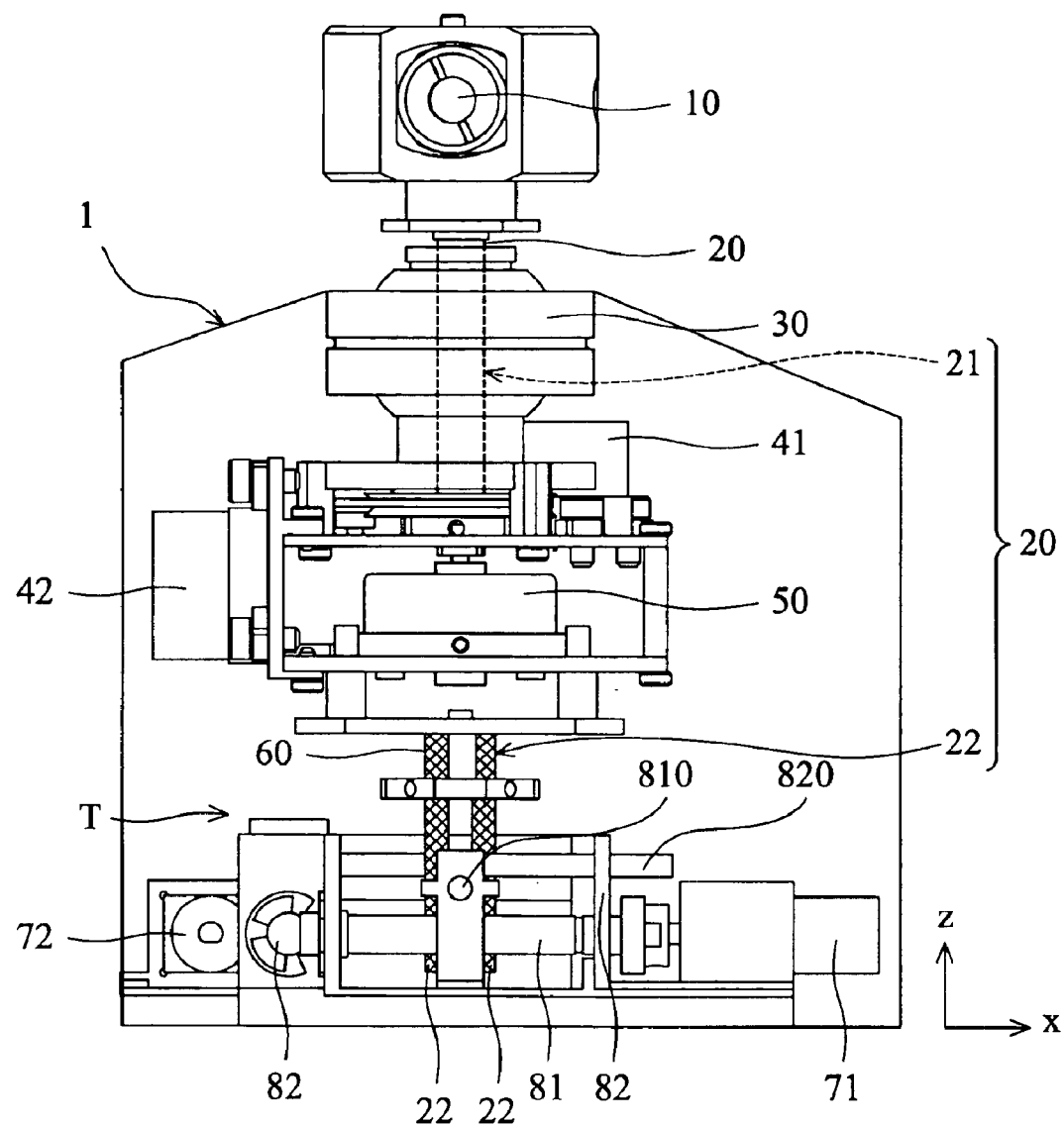
FIGS. 1a and 1b are perspective diagrams of the level in accordance with the present invention.
Figure 1B:
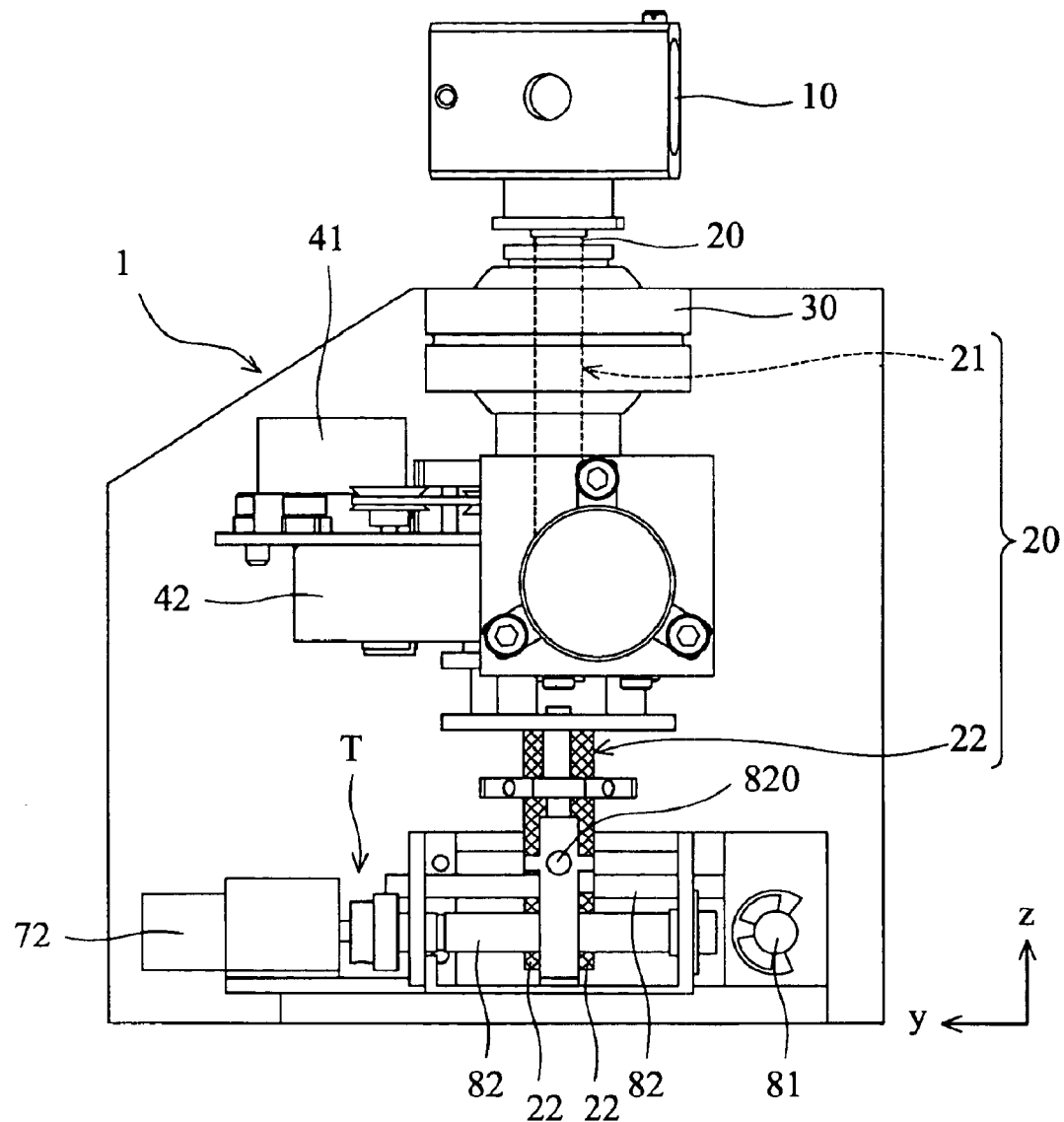
Figure 2:
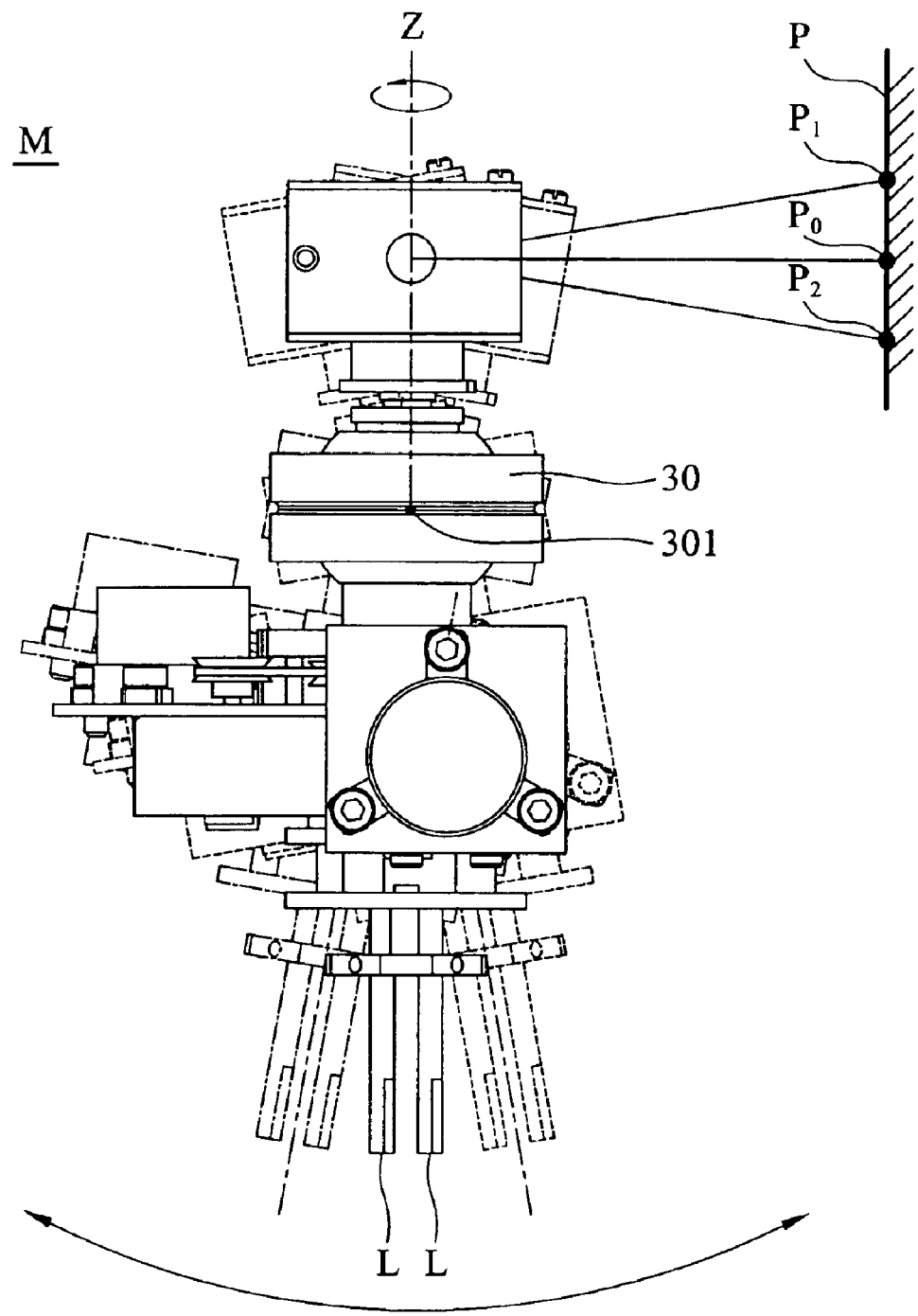
FIG. 2 is a perspective diagram of the main shaft and the light source rotating around the center of the universal joint in accordance with the present invention.

Referring to FIGS. 1a and 1b, the level of the present invention comprises a housing 1, an adjusting mechanism T, a light source 10, a main shaft 20, a universal joint 30 and a motor 50. The adjustment mechanism T and the universal joint 30 are disposed in the housing 1. The main shaft 20, provided with a rotary portion 21 and two protrusions 22, pivotably connects to the universal joint 30. As shown in FIG. 2, the main shaft 20 is longitudinal in accordance with the Z axis and spherically rotatable via the universal joint 30. The rotary portion 21 passes through the universal joint 30 and connects to the light source 10, such that the light source 10 and the rotary portion 21 are driven and rotatable around the Z axis by the motor 50. Thus, a projected plane is generated perpendicular to the Z axis by the light source 10 rotating and scanning with a rotary light ray.

In FIGS. 1a and 1b, the main shaft 20 has two protrusions 22 parallel thereto. To calibrate the projected plane generated by the light source 10, the adjustment mechanism T abuts and impels the protrusions 22 such that the rotary portion 21 and the light source 10 slightly rotate around the center 301 of the universal joint 30 as shown in FIG. 2.

As mentioned, the attitude of the light source 10 and the main shaft 20 can be adjusted by the adjustment mechanism T impelling the protrusions 22, wherein the rotary portion 21 rotates around the center 301 of the universal joint 30 to calibrate the light emission angle. In FIG. 2, the light source 10 projects light onto an object P, forming different light points P0, P1 and P2 with respect to different emission angles.

In this embodiment, the level comprises a simple structure, wherein the light source 10 projects light onto the object P directly without deflection. Moreover, the level is provided with a XY plane sensor 41 and a Z axis sensor 42 detecting horizontal and vertical deflection. Simultaneously, an adjustment signal is transmitted from the sensors 41, 42 to the adjustment mechanism T to modify the projected attitude of the light source 10. When the level is placed on an uneven surface, for instance, the adjustment mechanism T impels the protrusions 22 and the light source 10 around the universal joint 30, such that the attitude is adjusted and the emitted light is rectified in accordance with the reference plane.

Figure 3:
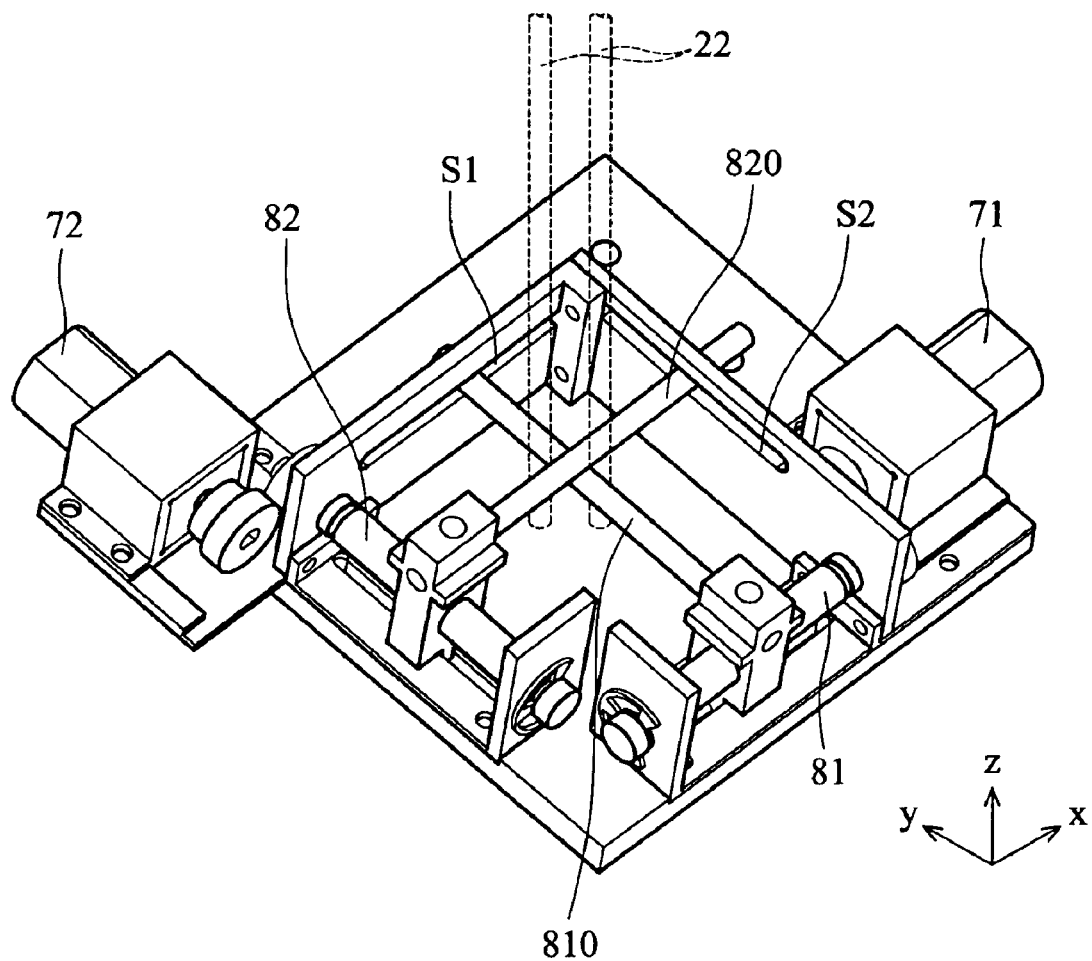
FIG. 3 is a perspective diagram of the main shaft adjusting mechanism movably contacting the protrusions in accordance with the present invention.

As shown in FIG. 3, the adjustment mechanism T comprises motors 71 and 72, a first guide rod 81, a second guide rod 82, a first movable member 810 and a second movable members 820 crossing each other, wherein the guide rods 81, 82 are threaded screw rods. The motor 71 impels the first movable member 810 along the X axis via the first guide rod 81 connected thereto, and correspondingly, the motor 72 impels the second movable member 820 along the X axis via the second guide rod 82 connected thereto. The adjustment mechanism T further comprises a first guide slot S1 and a second guide slot S2 with the first and second movable members 810, 820 disposed therein, such that the movable members 810, 820 are accurately guided along the XY plane. In FIG. 3, the two protrusions 22 are individually located in opposite sides of the first and second movable members 810, 820. Thus, the adjustment mechanism T impels the protrusions 22 in any direction on XY plane, and the attitude of the light source 10 is appropriately rectified to achieve accurate calibration.

Figure 4:
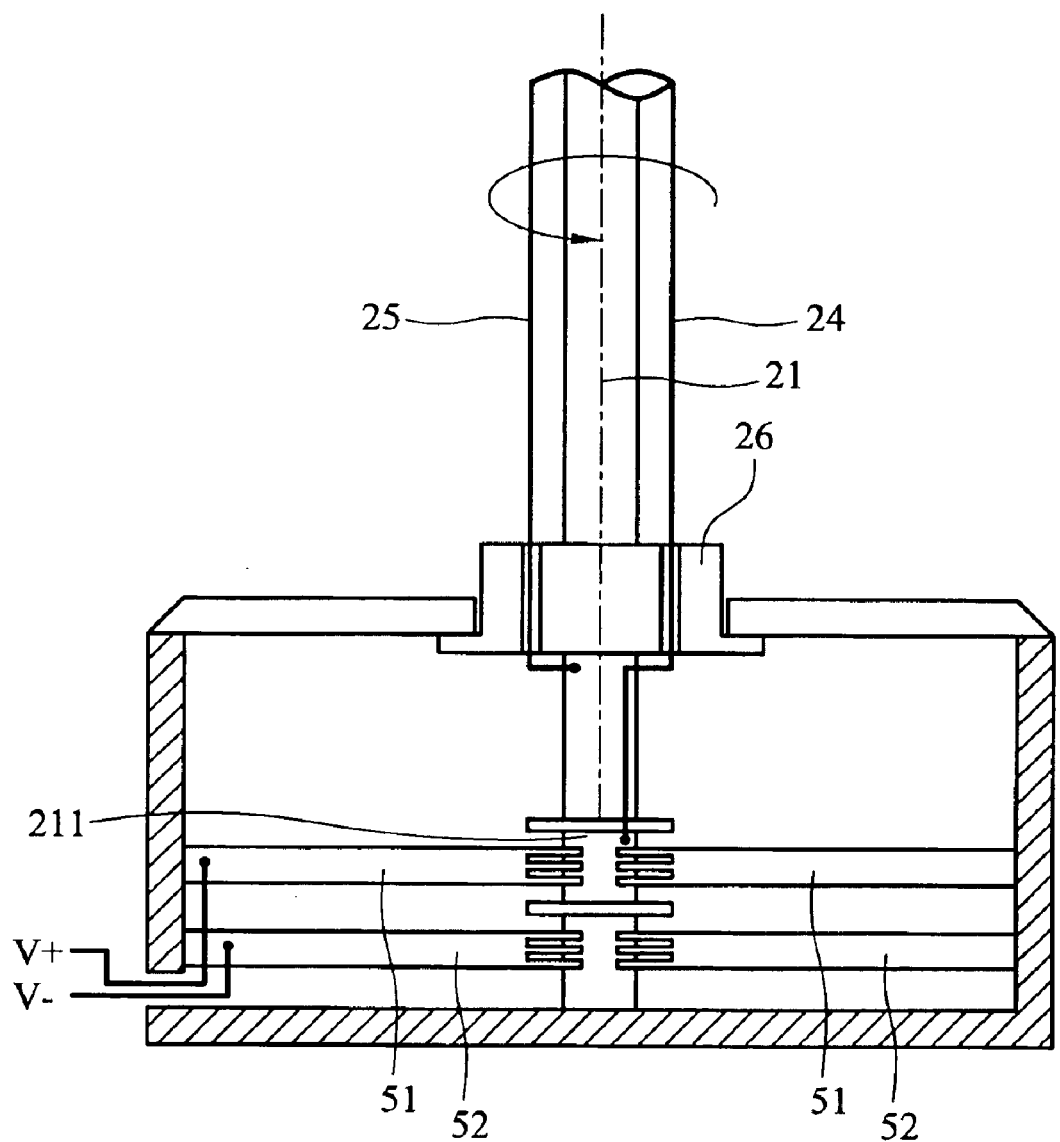
FIG. 4 is a perspective diagram of the motor 50 in accordance with the present invention.

With respect to the motor 50 as shown in FIG. 4, the rotary portion 21 of the main shaft 20 is rotatably disposed at the center thereof. The motor 50 has a first brush 51 connecting the positive electrode V+ and a second brush 52 connecting the negative electrode V−. A conductive bushing 211, insulated from the main shaft 20, is disposed surrounding the rotary portion 21 and electrically contacting the first brush 51. The second brush 52 electrically contacts the bottom of the rotary portion 21.

As shown in FIG. 4, the first conductive wire 24 connects the conductive bushing 211 and the light source 10, moreover, the second conductive wire 25 connects the rotary portion 21 and the light source 10. As the conductive wires 24, 25 connect the light source 10 and form a closed loop circuit, the light source 10 is driven to emit light and the rotary portion 21 is powered simultaneously to rotate by the motor 50. Furthermore, as the conductive wires 24, 25 are disposed through the rotor 26, synchronously rotating with the rotary portion 21, tangling of conductive wires 24 and 25 is avoided.

In summary, the present invention provides a level automatically producing a standard level line suitable for use in various environments. The level can also provide a vertical level line by inclining by 90°. The level has a simple structure and low cost, capable of overcoming deflection even when deployed on an uneven surface.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A level, producing a projected plane substantially parallel to a reference plane, comprising:
    a housing;
    a light source rotatably emitting light to form the projected plane;
    a main shaft perpendicular to the projected plane, connecting the light source, comprising a rotary portion and a pair of protrusions;
    a universal joint disposed in the housing with the main shaft rotatably passing therethrough;
    a level sensor detecting inclination of the projected plane deviated from the reference plane and outputting an adjustment signal; and
    an adjustment mechanism disposed in the housing, comprising a first movable member and a second movable member crossing each other, wherein the first movable member impels one protrusion along a first axis, and the second movable member impels one protrusion along a second axis substantially perpendicular to the first axis according to the adjustment signal, whereby the main shaft is rotated around the universal joint being perpendicular to the reference plane with the projected plane parallel thereto.

2. The level as claimed in claim 1, wherein the adjustment mechanism further comprises a first guide slot with the first movable member movably disposed therein and a second slot with the second movable member movably disposed therein.

3. The level as claimed in claim 1, wherein the first movable member moves along the first axis and the second movable member moves along the second axis.

4. The level as claimed in claim 1, wherein the protrusions are individually located on opposite sides of the first and second movable members.

5. The level as claimed in claim 3, wherein the adjustment mechanism further comprises a first guide rod parallel to the first axis and a second guide rod parallel to the second axis, wherein the first guide rod connects to and impels the first movable member along the first axis, and the second guide rod connects to and impels the second movable member moving along the second axis.

6. The level as claimed in claim 5, wherein the first and second guide rods are threaded screw rods.

7. The level as claimed in claim 1, wherein the first movable rod is perpendicular to the second movable rod.

8. The level as claimed in claim 5, wherein the adjustment mechanism further comprises a first motor driving the first guide rod and a second motor driving the second guide rod.

9. The level as claimed in claim 1, further comprising a third motor providing power to the rotary portion and the light source simultaneously to rotate and generate the projected plane.

10. The level as claimed in claim 9, wherein the third motor comprises a rotor, a conductive bushing surrounding and insulated from the rotary portion, a first conductive wire connecting to the light source and the conductive bushing, a second conductive wire connecting to the light source and the rotary portion, a first brush electrically connecting to the conductive bushing and a power, a second brush electrically connecting to the rotary portion and the power, whereby the power drives the light source rotating along with the rotor, the conductive bushing, and the first and second conductive wires.

* * * * *